(12) United States Patent
Lehman et al.

(10) Patent No.: US 8,677,429 B2
(45) Date of Patent: Mar. 18, 2014

(54) RESOURCE CONFLICT RESOLUTION FOR MULTIPLE TELEVISION

(75) Inventors: Yonatan Lehman, Moshav Bet Gamliel (IL); Ezra Darshan, Nofei Aviv (IL)

(73) Assignee: Cisco Technology Inc., San Jose, CA (US)

(*) Notice: Subject to any disclaimer, the term of this patent is extended or adjusted under 35 U.S.C. 154(b) by 1910 days.

(21) Appl. No.: 11/579,651

(22) PCT Filed: May 4, 2005

(86) PCT No.: PCT/IL2005/000472
§ 371 (c)(1),
(2), (4) Date: Dec. 18, 2006

(87) PCT Pub. No.: WO2005/107367
PCT Pub. Date: Nov. 17, 2005

(65) Prior Publication Data
US 2008/0034391 A1 Feb. 7, 2008

Related U.S. Application Data

(60) Provisional application No. 60/568,878, filed on May 6, 2004.

(51) Int. Cl.
*H04N 7/173* (2011.01)
(52) U.S. Cl.
USPC ............. 725/93; 386/292; 386/293; 709/225; 709/226; 709/229; 709/232; 709/240
(58) Field of Classification Search
USPC ............. 725/59, 93, 116, 146; 386/292–293; 709/225–226, 229, 232–235, 240
See application file for complete search history.

(56) References Cited

U.S. PATENT DOCUMENTS

| 5,973,683 | A | * | 10/1999 | Cragun et al. ................. 715/719 |
| 6,208,799 | B1 | | 3/2001 | Marsh et al. |
| 6,505,348 | B1 | | 1/2003 | Knowles et al. |
| 6,507,951 | B1 | | 1/2003 | Wugofski |
| 6,637,029 | B1 | * | 10/2003 | Maissel et al. .................. 725/46 |
| 6,785,901 | B1 | | 8/2004 | Horiwitz et al. |
| 6,859,845 | B2 | * | 2/2005 | Mate ................................ 710/5 |
| 7,251,255 | B1 | * | 7/2007 | Young ........................... 370/468 |
| 8,091,100 | B2 | * | 1/2012 | Donato .......................... 725/10 |
| 2002/0164155 | A1 | * | 11/2002 | Mate .............................. 386/96 |
| 2002/0168178 | A1 | | 11/2002 | Rodriguez et al. |

(Continued)

FOREIGN PATENT DOCUMENTS

EP    1 213 919   A2    6/2002
EP    1 355 496   A2    10/2003

(Continued)

*Primary Examiner* — Yassin Alata
(74) *Attorney, Agent, or Firm* — Husch Blackwell LLP

(57) ABSTRACT

A system for managing resource-usage conflict among a plurality of viewers associated with a plurality of TVs, including a plurality of resources for shared usage among the viewers, the resources including at least one input device adapted to receive a program broadcast and to transmit the program broadcast onward for display, a resolution arrangement operationally connected to the at least one input device, the resolution arrangement being adapted to identify a usage conflict of at least one of the resources, and send an on-screen display having a resource usage action-choice to at least two of the TVs. Related apparatus and methods are also described.

29 Claims, 11 Drawing Sheets

(56) References Cited

U.S. PATENT DOCUMENTS

| | | |
|---|---|---|
| 2002/0174430 A1 | 11/2002 | Ellis et al. |
| 2002/0194589 A1* | 12/2002 | Cristofalo et al. ............. 725/32 |
| 2003/0066092 A1 | 4/2003 | Wagner et al. |
| 2003/0079227 A1 | 4/2003 | Knowles et al. |
| 2003/0088872 A1 | 5/2003 | Maissel et al. |
| 2003/0163811 A1 | 8/2003 | Luehrs |
| 2003/0198462 A1 | 10/2003 | Bumgardner et al. |
| 2003/0204848 A1 | 10/2003 | Cheng et al. |
| 2004/0103434 A1 | 5/2004 | Ellis |
| 2004/0156614 A1 | 8/2004 | Bumgardner et al. |
| 2004/0244030 A1* | 12/2004 | Boyce et al. ............. 725/25 |
| 2004/0268407 A1* | 12/2004 | Sparrell et al. ............. 725/116 |
| 2005/0005300 A1 | 1/2005 | Putterman et al. |
| 2005/0271040 A1* | 12/2005 | Schmidt et al. ............. 370/352 |

FOREIGN PATENT DOCUMENTS

| | | |
|---|---|---|
| EP | 1355496 * | 10/2003 |
| EP | 1 469 676 A1 | 10/2004 |
| WO | WO 9901984 A1 * | 1/1999 |
| WO | WO 99/66725 | 12/1999 |
| WO | WO 00/01149 | 1/2000 |
| WO | WO 00/52930 | 9/2000 |
| WO | WO 02/093299 A2 | 11/2002 |
| WO | WO 2004/049714 A1 | 6/2004 |

* cited by examiner

RESOURCE CONFLICT RESOLUTION FOR MULTIPLE TELEVISION

The present application is a 35 USC §371 application of PCT/IL2005/000472, filed on 4 May 2005 and entitled "Resource conflict resolution for multiple televisions", which was published on 17 Nov. 2005 in the English language with International Publication Number WO 2005/107367 A2 and which relies for priority on U.S. Provisional Application Ser. No. 60/568,878 filed 6 May 2004, which is hereby incorporated by reference as if fully set forth herein.

FIELD OF THE INVENTION

The present invention relates to television systems, and in particular, the present invention relates to a personal video recorder (PVR) for use with a plurality of televisions.

BACKGROUND OF THE INVENTION

Personal Video Recorder (PVR) systems, which are typically integrated with a cable or satellite television set-top box (STB), are used, amongst other functions, to record broadcasted programs onto a hard disk of the PVR. One example of a PVR system is described in PCT Published Patent Application WO2000/01149 of NDS Ltd. and corresponding US Published Patent Application 2003/088872 of Maissel, et al., the disclosures of which are hereby incorporated herein by reference.

Resource conflicts may occasionally arise when a PVR is used. For example, in a PVR with a single tuner, it is not possible to view live TV of one channel and record TV broadcast from another channel simultaneously or to record more than one program simultaneously. Similarly, in a PVR with two tuners, it is not possible to watch live TV and record more than one program simultaneously or to record more than two programs simultaneously. The hard disk and disk drive are typically also limited resources of a PVR. For example, the hard disk may fill up or there may be too many input/output requests for the disk drive to perform, such as when recording and/or playing multiple programs. Another example of a limited resource is booking conflicts, where too many events are booked for recording at the same time, thus potentially creating a predicted future resource conflict. Booking conflicts are special in that they require a check of future resources, as opposed to an immediate requirement for a resource.

When a PVR is connected to a single television (hereinafter "TV"), conflict resolutions are typically handled in the following manner. First, the PVR tries to resolve the conflict automatically. For example, if the disk is full then the PVR will delete or overwrite the oldest recorded program first. However, conflicts may arise that the PVR cannot handle automatically, for example, when all the programs stored on the disk are marked as "keep" or when the viewer has requested to record two programs simultaneously but also wants to watch live TV and the PVR only has two tuners. In such cases, typically the PVR sends an on-screen display to the TV for the viewer to decide what action to take. The choices may be for example, "forgo live TV", "cancel recording 1" or "cancel recording 2". If the resource conflict is not resolved by the viewer within a defined time, the PVR will perform default conflict resolution, for example, canceling some conflicting booked recordings until there are no more conflicts.

The following is a list of patent publications which are representative of the art related to conflict resolution for a single TV: US Published Patent Applications 2003/0198462 of Bumgardner, et al. and 2002/0168178 of Rodriguez, et al. and PCT Published Patent Application WO2004/049714 of United Video Properties Inc.

A single PVR, and therefore the resources thereon, are sharable by a plurality of TVs. Each TV is typically connected to the outputs (digital or analogue) of the PVR via a user interface unit. Similarly, multiple TVs may share multiple PVRs connected by a network. This set up is known as a multi-TV PVR. Therefore, the viewer of each TV can share the tuning and recording facilities of the PVR(s). In a multi-TV PVR environment resource conflicts may arise, for example, conflicts associated with the tuners, hard disk and disk drive. Additionally, in a networked environment, network bandwidth is also a limited resource and the network typically has a data transfer limit. For example, where a network is used to view TV then overuse of a network may make the network response sluggish so that TV viewing or response to "trick modes" is compromised which is generally unacceptable in the TV world.

Of general interest is US Published Patent Application 2003/0079227 of Knowles, et al., which describes a multi-user integrated program guide for use with a multi-TV PVR. Knowles describes resolving user conflicts relating to double purchasing of the same program or canceling someone else's booked recording. Knowles does not describe or suggest resolving conflicts related to resources of a multi-TV (networked) PVR system. Also of interest is U.S. Pat. No. 6,637,029 to Maissel, et al., which describes a system for determining tastes and preferences of viewers by inference from viewing habits.

The following references are also believed to represent the state of the art:

US Published Patent Application 2004/0156614 of Bumgardner, et al.;

US Published Patent Application 2004/0103434 of Ellis;

US Published Patent Application 2003/0066092 of Wagner, et al.;

PCT Published Patent Application WO 2002/093299 of Scientific-Atlanta, Inc.;

PCT Published Patent Application WO 2000/052930 of Starsight Telecast, Inc.;

European Published Patent Application EP 01469676 of United Video Properties Inc.;

European Published Patent Application EP 1213919 of United Video Properties Inc.;

U.S. Pat. No. 6,785,901 to Horiwitz, et al.; and

U.S. Pat. No. 6,505,348 to Knowles, et al.

The disclosures of all references mentioned above and throughout the present specification, as well as the disclosures of all references mentioned in those references, are hereby incorporated herein by reference.

SUMMARY OF TIE INVENTION

The present invention seeks to provide a resource conflict resolution system for a multi-TV environment.

The system of the present invention, in preferred embodiments thereof, includes a conflict resolution unit for identifying and determining the nature of the conflict involved. Once the conflict is determined, the conflict resolution unit typically sends a message to a user resolution unit for resolving the conflict. Preferably, the user resolution unit first tries to solve the conflict using an automated method, for example, but not limited to, deleting old programs which have not been marked as "keep" from the disk. If automatic resolution cannot be employed, the user resolution unit sends an on-screen display to one or more of the TVs in order to resolve the conflict. If viewer interaction does not resolve the conflict, default resolution rules are generally applied. In fact, in accordance with one embodiment of the present invention, one of the options a viewer may choose is to return the conflict to the PVR for default resolution. Default resolution is generally based on a set of rules to decide which recording to forgo, thereby resolving a tuner conflict, or which recording to delete based on some parameters such as oldest recording, longest recording, pay-per-view, etc.

There is thus provided in accordance with a preferred embodiment of the present invention a system for managing resource-usage conflict among a plurality of viewers associated with a plurality of TVs, including a plurality of resources for shared usage among the viewers, the resources including at least one input device adapted to receive a program broadcast and to transmit the program broadcast onward for display, a resolution arrangement operationally connected to the at least one input device, the resolution arrangement being adapted to identify a usage conflict of at least one of the resources, and send an on-screen display having a resource usage action-choice to at least two of the TVs.

Further in accordance with a preferred embodiment of the present invention the resolution arrangement is adapted to send the on-screen display to the TVs in a consecutive manner.

Still Further in accordance with a preferred embodiment of the present invention the resolution arrangement is further adapted to determine the order of sending the on-screen display based on a priority assignment of the TVs.

Additionally in accordance with a preferred embodiment of the present invention the resource usage action-choice includes an option for passing the resource usage action-choice to another one of the TVs.

Moreover in accordance with a preferred embodiment of the present invention the resolution arrangement is further adapted to determine the other TV based on a priority assignment of the TVs.

Still further in accordance with a preferred embodiment of the present invention the resolution arrangement is adapted to determine the other TV based on a next lowest priority TV, in relation to a priority of the TV which was sent the resource usage action-choice, the priority assignment.

Additionally in accordance with a preferred embodiment of the present invention the resolution arrangement is adapted to determine the other TV based on a next highest priority TV, in relation to a priority of the TV which was sent the resource usage action-choice, the priority assignment.

Moreover in accordance with a preferred embodiment of the present invention the resolution arrangement is further adapted to determine which of the TVs to send the on-screen display to based on a priority assignment of the TVs.

Further in accordance with a preferred embodiment of the present invention the resolution arrangement is adapted to determine which of the TVs to send the on-screen display to based on a lowest priority TV a priority assignment of the TVs.

Still further in accordance with a preferred embodiment of the present invention the resolution arrangement is adapted to determine which of the TVs to send the on-screen display to based on a highest priority TV a priority assignment of the TVs.

Additionally in accordance with a preferred embodiment of the present invention the priority assignment is based on a physical connection of the TVs to the system.

Moreover in accordance with a preferred embodiment of the present invention the priority assignment is based on a time of day.

Further in accordance with a preferred embodiment of the present invention the priority assignment is based on which of the viewers is viewing the TVs.

Still further in accordance with a preferred embodiment of the present invention the priority assignment is based on a nature of viewing currently being viewed on the TVs.

Additionally in accordance with a preferred embodiment of the present invention the priority assignment is based on a channel being viewed on each of the TVs.

Moreover in accordance with a preferred embodiment of the present invention the priority assignment is based on viewing time of each of the TVs.

Further in accordance with a preferred embodiment of the present invention the resolution arrangement is adapted to substantially concurrently send the on-screen display to the TVs.

Still further in accordance with a preferred embodiment of the present invention the resolution arrangement is adapted to substantially concurrently send the on-screen display to all of the TVs.

Additionally in accordance with a preferred embodiment of the present invention the resolution arrangement is adapted to resolve the usage conflict based on a first reply of the TVs.

Moreover in accordance with a preferred embodiment of the present invention the resolution arrangement is further adapted to resolve the usage conflict based on a reply to the resource usage action-choice.

Further in accordance with a preferred embodiment of the present invention the resolution arrangement is further adapted to apply a default resolution to the usage conflict after a specified time-out after sending the on-screen display.

Still further in accordance with a preferred embodiment of the present invention the resource usage action-choice has a plurality of options including forgo-live and cancel recording.

Additionally in accordance with a preferred embodiment of the present invention the options include an option to send the on screen display to another one of the TVs.

Moreover in accordance with a preferred embodiment of the present invention the input device is a tuner.

Further in accordance with a preferred embodiment of the present invention the input device is a removable media drive.

Still further in accordance with a preferred embodiment of the present invention the input device is a broadband internet protocol input.

Additionally in accordance with a preferred embodiment of the present invention the resources include a storage arrangement adapted to store the program broadcast therein, and the input device is adapted to transmit the program broadcast to the storage arrangement.

Moreover in accordance with a preferred embodiment of the present invention the resource usage action-choice includes an option to delete a recording.

Still further in accordance with a preferred embodiment of the present invention the at least one input device is adapted to receive informational data about a plurality of program broadcasts, and the resolution arrangement is adapted to prepare a program catalog screen for display, such that the program catalog screen excludes the informational data about at least one of the program broadcasts for at least one preselected time period.

Still further in accordance with a preferred embodiment of the present invention the resolution arrangement is adapted such that exclusion of the informational data about the program broadcasts is at least one of viewer dependent and TV dependent.

Additionally in accordance with a preferred embodiment of the present invention, the system includes a storage arrangement adapted to store program broadcasts therein, a database adapted to store recorded program informational data about the program broadcasts stored in the storage arrangement, wherein the resolution arrangement is further adapted to prepare a recorded program catalog screen for display, such that the recorded program catalog screen excludes the recorded program informational data about at least one of the program broadcasts for at least one pre-selected time period.

There is also provided in accordance with another preferred embodiment of the present invention a system for managing resource-usage conflict among a plurality of viewers associated with a plurality of TVs, including a plurality of resources for shared usage among the viewers, the resources including at least one input device adapted to receive a program broadcast and to transmit the program broadcast onward for display, a resolution arrangement operationally connected to the at least one input device, the resolution arrangement being adapted to identify a usage conflict of at least one of the resources, and always send an on-screen display, having a resource usage action-choice, to at least one of, a same one of the TVs and a same one of the viewers, for at least one class of usage conflicts.

Moreover in accordance with a preferred embodiment of the present invention the resolution arrangement is further adapted to resolve the usage conflict based on a reply to the resource usage action-choice.

Further in accordance with a preferred embodiment of the present invention the resolution arrangement is further adapted to apply a default resolution to the usage conflict after a specified time-out after sending the on-screen display.

Still further in accordance with a preferred embodiment of the present invention the resource usage action-choice has a plurality of options including forgo-live and cancel recording.

Additionally in accordance with a preferred embodiment of the present invention the input device is a tuner.

Moreover in accordance with a preferred embodiment of the present invention the input device is a removable media drive.

Further in accordance with a preferred embodiment of the present invention the input device is a broadband internet protocol input.

Still, further in accordance with a preferred embodiment of the present invention the resources include a storage arrangement adapted to store the program broadcast therein, and the input device is adapted to transmit the program broadcast to the storage arrangement.

Additionally in accordance with a preferred embodiment of the present invention the resource usage action-choice includes an option to delete a recording.

There is also provided in accordance with still another preferred embodiment of the present invention a system for providing restricted viewing of informational data associated with a plurality of program broadcasts, the system including at least one input device adapted to receive informational data about the program broadcasts, and a resolution arrangement operationally connected to the at least one input device, the resolution arrangement being adapted to prepare a program catalog screen for display, such that the program catalog screen excludes the informational data about at least one of the program broadcasts for at least one pre-selected time period.

Moreover in accordance with a preferred embodiment of the present invention the resolution arrangement is adapted such that exclusion of the informational data about the program broadcasts is at least one of viewer dependent and TV dependent.

Further in accordance with a preferred embodiment of the present invention the exclusion of the informational data is based on at least one of viewing habits, demographic attributes and geographic attributes.

Still further in accordance with a preferred embodiment of the present invention the input device is further adapted to receive the program broadcasts and transmitting the program broadcasts onward for storage, the apparatus further including a storage arrangement adapted to store the program broadcasts therein, and a database adapted to store recorded program informational data about the program broadcasts stored in the storage arrangement, wherein the resolution arrangement is further adapted to prepare a recorded program catalog screen for display, such that the recorded program catalog screen excludes the recorded program informational data about at least one of the program broadcasts for at least one pre-selected time period.

Additionally in accordance with a preferred embodiment of the present invention the resolution arrangement is adapted such that in a multi-TV environment, the exclusion of the informational data about the program broadcasts is configurable per TV.

Moreover in accordance with a preferred embodiment of the present invention the resolution arrangement is adapted such that in a multi-viewer environment, the exclusion of the informational data about the program broadcasts is configurable per viewer.

Further in accordance with a preferred embodiment of the present invention the resolution arrangement is adapted such the exclusion of the informational data is the same for at least one of all viewers in a multi-viewer environment and all TVs in a multi-TV environment.

There is also provided in accordance with still another preferred embodiment of the present invention a method for managing resource-usage conflict of a plurality of resources among a plurality of viewers associated with a plurality of TVs, the resources including at least one input device, each input device being adapted to receive a program broadcast and transmit the program broadcast onward for display, the method including identifying a usage conflict of at least one of the resources, and sending an on-screen display having a resource usage action-choice to at least two of the TVs.

There is also provided in accordance with still another preferred embodiment of the present invention a method for managing resource-usage conflict of a plurality of resources among a plurality of viewers associated with a plurality of TVs, the resources including at least one input device, each input device being adapted to receive a program broadcast and transmit the program broadcast onward for display, the method including identifying a usage conflict of at least one of the resources, and always sending an on-screen display, having a resource usage action-choice, to at least one of, a same one of the IVs and a same one of the viewers, for at least one class of usage conflicts.

There is also provided in accordance with still another preferred embodiment of the present invention a method for disabling viewing of informational data about a plurality of program broadcasts, including receiving the informational data, and preparing a program catalog screen for display, such that the program catalog screen excludes informational data about at least one of the program broadcasts for at least one pre-selected time period.

BRIEF DESCRIPTION OF THE DRAWINGS

The present invention will be understood and appreciated more fully, by way of example only, from the following detailed description, taken in conjunction with the drawings in which.

DETAILED DESCRIPTION OF A PREFERRED EMBODIMENT

Figure 1:
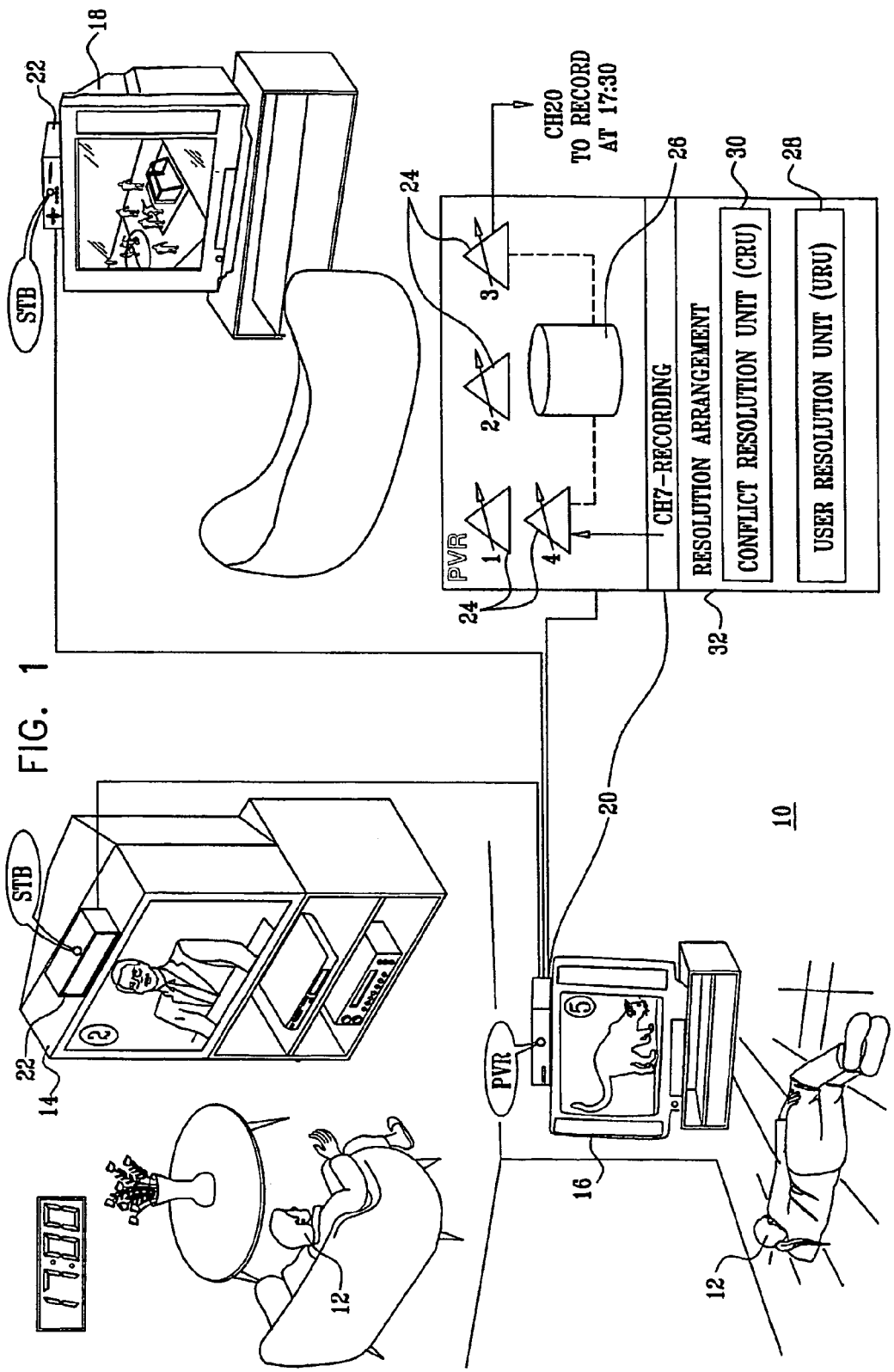
FIG. 1 is a partly pictorial, partly block diagram view of a personal video recorder conflict resolution system that is constructed and operative in accordance with a preferred embodiment of the present invention.

Reference is now made to FIG. 1, which is a partly pictorial, partly block diagram view of a personal video recorder (PVR) conflict resolution system 10 that is constructed and operative in accordance with a preferred embodiment of the present invention. System 10 is adapted to manage resource-usage conflict among a plurality of viewers 12 associated with a plurality of TVs 14, 16, 18. It will be appreciated by those ordinarily skilled in the art that the system 10 can be implemented to support two or more TVs, three TVs being shown by way of example only. The term "television" or "TV" is defined herein to include any appropriate display for viewing broadcasted and/or previously recorded programs. The term "program" is defined herein to include a collection of associated video frames accompanied by audio, audio only or an interactive broadcast service, for example, but not limited to games. The preferred embodiment of the present invention is described herein with reference to a single PVR connected to multiple TVs via "thin" slave set top boxes. However, it will be appreciated by those ordinarily skilled in the art that the teachings of the present invention apply to any suitable multi-TV environment, for example, but not limited to multiple PVRs connected by a network to multiple TVs.

System 10 includes a PVR 20 which, in addition to conventional components (not shown) typically includes a plurality of user interface units 22 (also known as thin client STBs), in operative association with the TVs 14, 16, 18 for controlling interaction therewith. PVR 20 includes a plurality of resources for shared usage among the viewers 12. The resources generally include one or more input devices, such as tuners 24, and a storage arrangement 26 including a disk and a disk drive. It will be appreciated by those ordinarily skilled in the art that the input devices can include any suitable input device for receiving media content, for example, but not limited to a broadband internet protocol input or a removable media drive. It will be appreciated by those ordinarily skilled in the art that storage arrangement 26 can include any suitable shared storage device such as a networked CD, DVD or VCR. It will be appreciated by those ordinarily skilled in the art that other resource, and therefore resource conflicts, are also included in the scope of the present invention. The PVR 20 includes four tuners 24. However, it will be appreciated by those ordinarily skilled in the art that the PVR 20 can include any appropriate number of tuners 24. Each tuner 24 is adapted to receive a program broadcast.

The storage arrangement 26 is adapted to store the program broadcast therein. Additionally, each tuner 24 is adapted to transmit the program broadcast onward for display by one of the TVs 14, 16, 18 and/or transmitting the program broadcast onward for storage by the storage arrangement 26.

In the example of FIG. 1, the TVs 14, 16, 18 are all showing live TV. The TV 14 is being viewed by a parent who is viewing the news. The TV 16 is being viewed by a child who is watching a nature program. The TV 18 is showing sport, but no one is viewing the TV. The PVR 20 is currently recording a program being broadcast on channel 7. Additionally, the PVR 20 has been programmed to record a program being broadcast on channel 20 at 17:30. Therefore, as there are only four tuners 24, there will be a resource conflict, due to a shortage of tuners, at 17:30 when an additional tuner is needed to record the program to be broadcast on channel 20. The system 10 includes elements to identify and resolve resource conflicts in conjunction with viewers, as necessary. The resource conflict resolution aspect of the system 10 is now described below.

The system 10 also includes a resolution arrangement 32 typically having a user resolution unit 28 and a conflict resolution unit 30. The resolution arrangement 32 is operationally connected to the tuners 24 and the storage arrangement 26. The user resolution unit 28 and the conflict resolution unit 30, together, are preferably operative to implement one or more of the methods described hereinbelow, typically in an appropriate combination of hardware and software. Typically, the conflict resolution unit 30 identifies and determines the usage conflict of one or more of the resources of the PVR 20. Usage conflicts are typically identified by maintaining a flag of: the usage status of each tuner 24; or an asynchronous event such as storage arrangement 26 filling up. It will be appreciated by those ordinarily skilled in the art that there are other suitable methods for identifying usage conflicts. The user resolution unit 28 generally handles the resolution of the conflict. The conflict resolution is generally based on a sequence of rules including allocating the conflict resolution to a particular viewer if the conflict arises from that viewer (for example, a particular viewer has requested to record, but the disk is now full), automatic resolution, viewer input resolution via the user interface units 22 and default resolution.

Viewer input resolution preferably includes sending an on-screen display having a resource usage action-choice to at least one of the TVs 14, 16, 18. In cases where the resource conflict arises from a specific viewer action, it may be possible to send the on-screen display to the viewer. However, in a multi-viewer environment where all the resources are generally shared, it is generally difficult to assign a resource conflict to a particular viewer. Therefore, the user resolution unit 28 preferably uses a set of predetermined rules for deciding which of the TVs 14, 16, 18 is sent the on-screen display.

The user resolution unit 28 is preferably adapted to resolve the usage conflict based on a reply to the resource usage action-choice. However, the user resolution unit 28 is typically adapted to apply a default resolution to the usage conflict after a specified time-out after sending the on-screen display to the viewer(s). Default resolution is described in more detail with reference to FIGS. 5 and 6.

The user resolution unit 28 typically includes a plurality of viewer selectable modes for deciding how on-screen displays should be handled. The three modes typically include: "Specific TV only", "All TVs" and "Specific TV First". The modes are now described below. However, it should be noted that the modes are described in more detail with reference to FIGS. 2 to 8.

In "Specific TV Only" mode, a viewer conflict on-screen display is always sent to the same specific TV, or the same viewer, for one or more classes of usage conflicts. Typically, the specific TV is a highest priority TV as defined by a set of priority rules. However, it will be appreciated by those ordinarily skilled in the art that the on-screen display can be sent to the lowest priority TV The term "highest" priority typically refers to the most important TV or viewer and "lowest" priority typically refers to the least important TV or viewer. There are situations where it is preferable for the on-screen display to be sent to the lowest priority TV or viewer, for example, but not limited to when the highest priority viewer does not want to be disturbed by the on-screen display. There are situations where it is preferable for the on-screen display to be sent to the highest priority TV or viewer, for example, but not limited to when a parent wants to control resource usage of the children.

Each TV is assigned a "priority" for the purposes of conflict resolution. For example, the Children's TV is assigned a lower priority than the Parents' TV, or the Bedroom TV is assigned a lower priority than the Living Room TV. Alternatively or additionally, different viewers may be assigned different priorities, and viewers might "log in" when using a TV. Priority-rules are described in more detail with reference to FIG. 4. Default conflict resolution is typically employed if the viewer of the targeted TV does not respond within a given time, as in this mode no other user is sent an on-screen display for the conflict resolution.

In "All TVs" mode, a viewer conflict on-screen display is typically sent to a group of TVs, or preferably all TVs, concurrently. In general, user resolution unit 28 acts upon the choice of the viewer of the first TV to respond to the on-screen display and removes the on-screen displays from the other TVs. However, there are some exceptions described below with reference to FIG. 8. Default conflict resolution is typically employed if none of the TVs respond within a given time or if all other possibilities have been exhausted.

In "Specific TV First" mode, on-screen displays are sent consecutively to TVs based on a priority of the TVs. Typically, the on-screen display is first displayed on a lowest priority TV and then on a higher priority TV. This means that all the higher priority (more important) TVs are undisturbed and continue using the resource. For example, if a resource conflict requires viewer intervention, an on-screen display is displayed on the first TV. If no response is received after a given time, the on-screen display is displayed on the "next" TV according to a priority of the TVs. Default conflict resolution is preferably used if all the TVs have had the on-screen display displayed and none of the TVs have responded.

It will be appreciated by those ordinarily skilled in the art that the on-screen display can first be displayed on a highest priority TV and then on a lower priority TV.

It is possible for two or more TVs to share the same level of priority. In this case, the TVs of the same level are generally sent a message concurrently similar to the method of the "ALL TVs" mode. By way of example, if there are five TVs, then the priority list is definable as a list of <TVn, PRIORITYn> where a number of TVs have the same priority. An example list may appear as below:

<TV2, 1>
    <TV1, 2>
    <TV3, 2>
    <TV5, 3>

The user resolution unit 28 is adapted to send the on-screen display to the TVs according to priority, from the lowest priority (3) to the highest priority (1). Therefore, the on-screen display is first sent to TV5. Next, as there is more than one TV having priority 2, the user resolution unit 28 is adapted to concurrently send the on-screen display to TV1 and TV3. Finally, if necessary, the on-screen display is sent to TV2. TV4 is excluded from the priority listing and is therefore not sent an on-screen display.

It will be appreciated by those ordinarily skilled in the art that the above methods may be used in combination. Additionally, it will be appreciated by those ordinarily skilled in the art that the above methods are described by way of example only and that other methods of determining which viewer(s) should receive an on-screen display is included within the scope of the present invention. It will be appreciated by those ordinarily skilled in the art that the components included in the PVR 20 are shown functionally, and may in fact be implemented as a single unit or otherwise.

Figure 2:
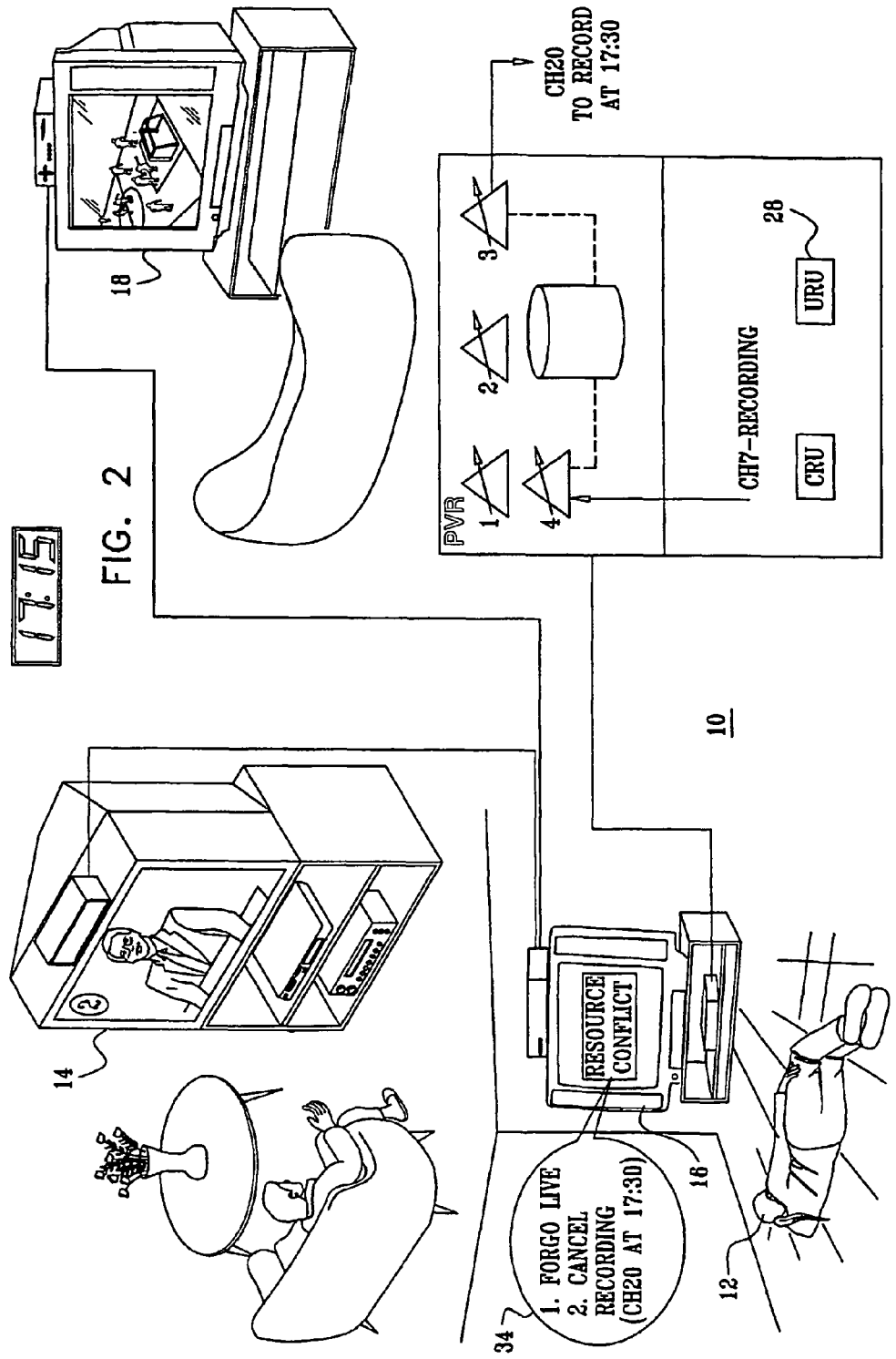
FIG. 2 is a partly pictorial, partly block diagram view of the system of FIG. 1 presenting a lowest priority TV with a first example of a resource usage action-choice on-screen display.

Reference is now made to FIG. 2, which is a partly pictorial, partly block diagram view of the system 10 of FIG. 1 presenting a specific TV only with a first example of a resource usage action-choice on-screen display 34. FIG. 2 shows the resource usage action-choice on-screen display 34 being presented to TV 16. The resource usage action-choice on-screen display 34 has a plurality of options, including options such as, "forgo-live" and "cancel recording". The option of sending the resource usage action-choice on-screen display 34 to another viewer does not exist in this example, as the other TV's are excluded from conflict resolution process. The viewer 12 of the TV 16 now has the option to either forgo viewing live TV or to cancel the scheduled recording of channel 20 at 17:30. If the viewer 12 does not respond to the resource usage action-choice on-screen display 34 by a given timeout, the user resolution unit 28 preferably imposes a default resolution, which in this case would typically be to cancel the scheduled recording at 17:30. The timeout is typically a predetermined time period (such as 5 minutes) or the time of the impending resource conflict (17:30 in this example), whichever is sooner.

Figure 3:
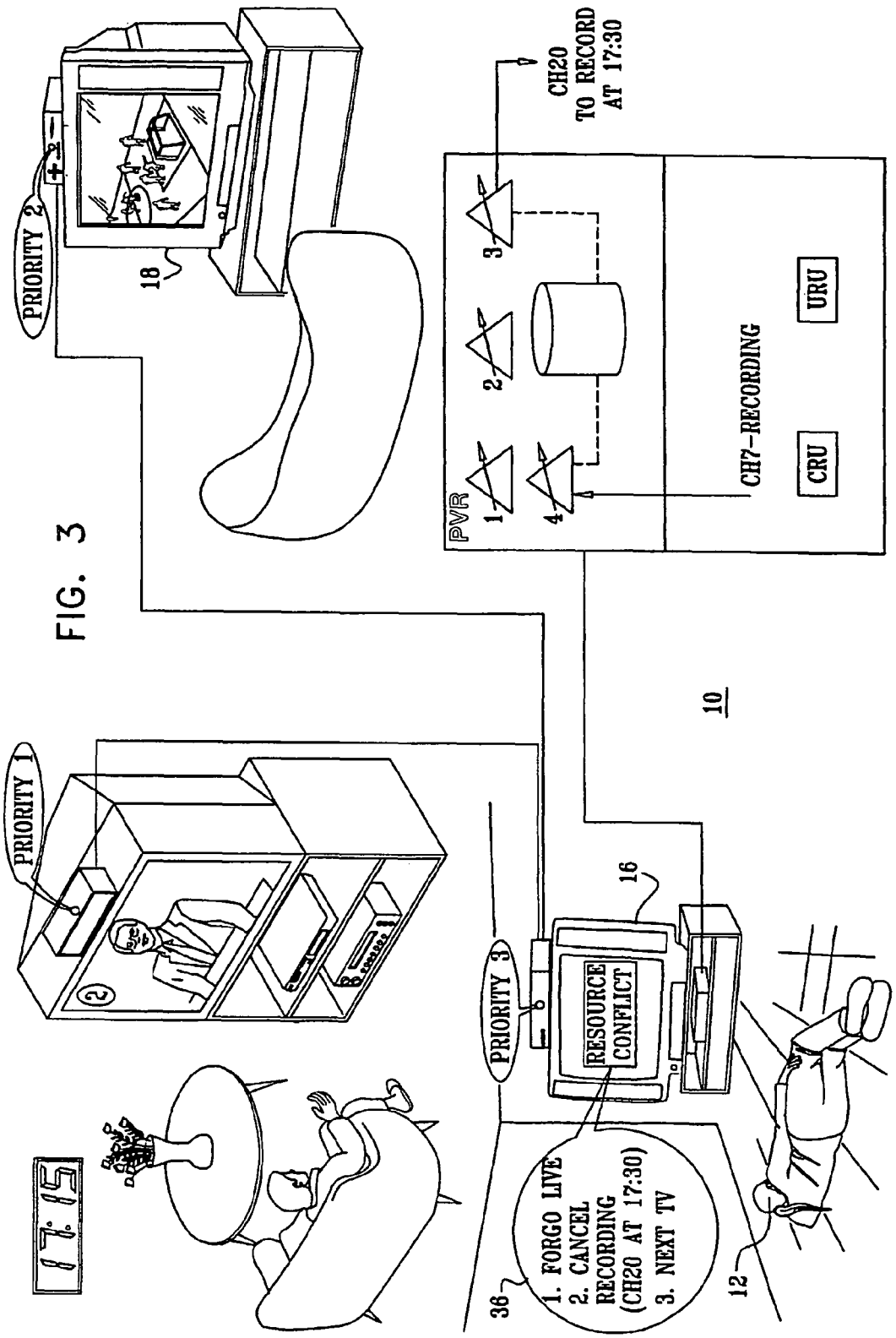
FIG. 3 is a partly pictorial, partly block diagram view of the system of FIG. 1 presenting a lowest priority TV with a second example of a resource usage action-choice on-screen display.

Reference is now made to FIG. 3, which is a partly pictorial, partly block diagram view of the system 10 of FIG. 1 presenting the lowest priority TV, the TV 16 with a second example of a resource usage action-choice on-screen display 36. In the examples of FIGS. 3 to 9, the TV 16 has the lowest priority (priority 3), the TV 18 has the next lowest priority (priority 2) and the TV 14 has the highest priority (priority 1).

Whichever criterion is used to select the TV that gets the initial on-screen display, a problematic situation arises when the initial on-screen display should really be sent to another TV, as in the example of FIG. 3, where the viewer 12 of the TV 16 knows that there is no one viewing the TV 18. Another example is where another TV is being viewed by the children, who should actually be doing their homework at this time. Therefore, the on-screen display is not always initially sent to a TV which should be making the decision of whether to "forgo live" or "cancel recording". Therefore, the resource usage action-choice on-screen display 36 generally includes an additional option of "next TV" or "other TV" so that the viewer of a TV is able to request that the resource usage action-choice on-screen display 36 is passed to another TV. The three options listed in the resource usage action-choice on-screen display 36 are examples of options relating to a tuner resource conflict. It will be appreciated by those ordinarily skilled in the art that other options can be used to solve both tuner and other resource conflicts, for example, but not limited to "Send to TV N".

Figure 4:
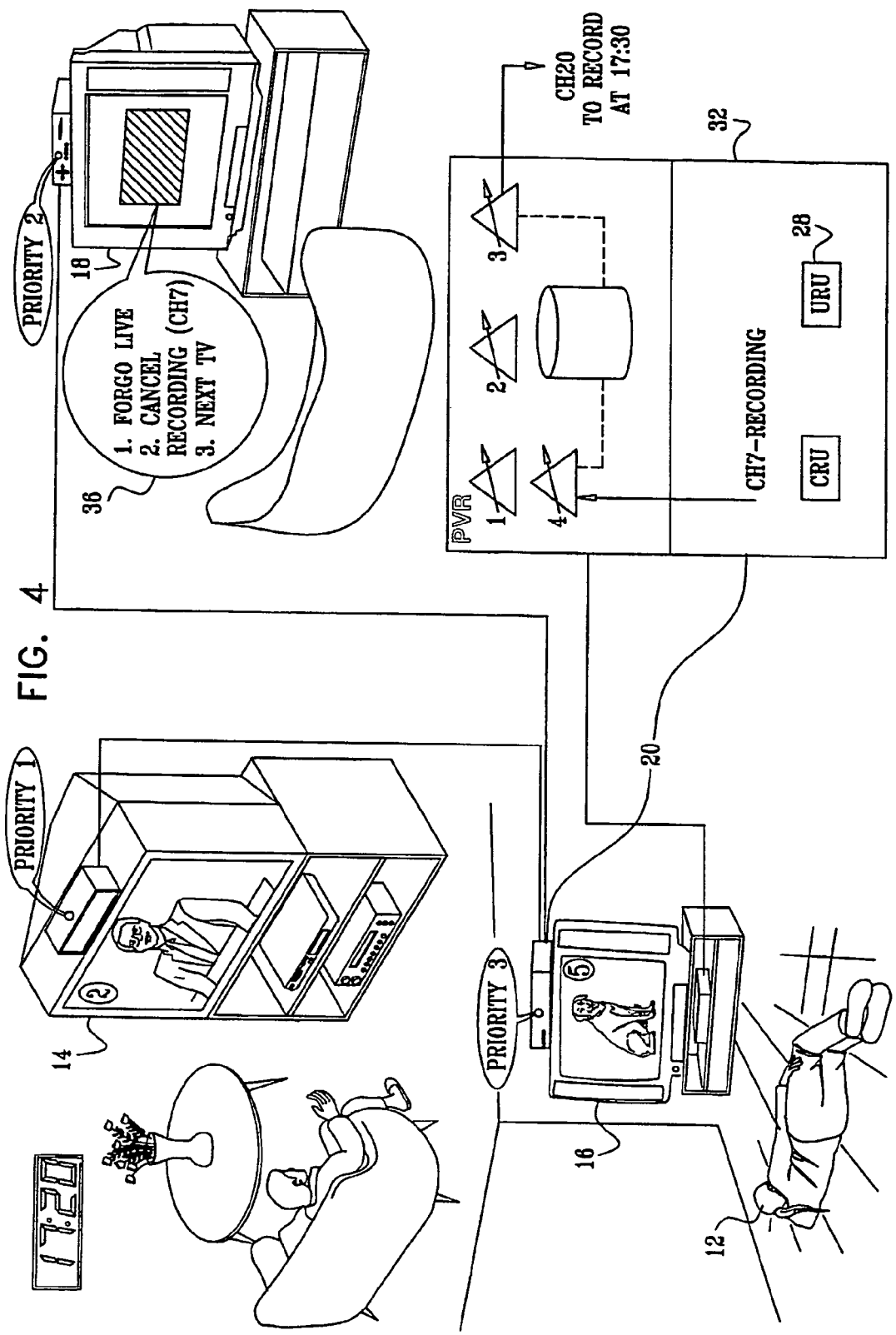
FIG. 4 is a partly pictorial, partly block diagram view of the system of FIG. 1 passing the resource usage action-choice on-screen display of FIG. 3 to a next lowest priority TV.

Reference is now made to FIG. 4, which is a partly pictorial, partly block diagram view of the system 10 of FIG. 1 passing the resource usage action-choice on-screen display 36 of FIG. 3 to a next lowest priority TV, the TV 18. The resource usage action-choice on-screen display 36 is generally passed to another TV for one of two reasons. First, the viewer 12 of the TV 16 selected "Next TV". Second, the viewer 12 of the TV 16 did not respond to the resource usage action-choice on-screen display 36 within a specified timeout.

The user resolution unit 28 typically determines the next or other TV based on a priority assignment of the TVs. For example, the determination of the next TV is based on a next lowest priority TV, in relation to a priority of the current TV according to a priority assignment of the TVs. Therefore, in the scenario of FIGS. 3 and 4, the resource usage action-choice on-screen display 36 is now presented to the next lowest priority TV, which in our case is the TV 18. As the TV 18 is not being viewed, the resource usage action-choice on-screen display 36 is displayed until a timeout is reached and then a default conflict resolution response is typically imposed, for example, but not limited to canceling live TV of TV 18. Default conflict resolution is described in more detail with reference to FIG. 5.

It will be appreciated by those ordinarily skilled in the art that if the first TV is the highest priority TV, then the next TV to be selected will typically be the next highest priority TV, in relation to the priority of current TV.

Remaining in FIG. 4, it will be appreciated by those ordinarily skilled in the art that resource usage action-choice on-screen display 36 could be passed on to TV 14 if a timeout is reached on TV 18. This approach being particularly suitable when a disk conflict is involved, as default erasing from the disk is only applied as a last resort. However, if there is someone present at the TV 18 (which is not the case of FIG. 4), then the viewer of the TV 18 has the option to respond to one of the options, including "Next TV", which generally results in the resource usage action-choice on-screen display 36 being passed to the TV 14, which has the next lowest priority and in this case the highest priority. It is possible for the resource usage action-choice on-screen display 36 to be passed around the TVs until a viewer resolution to the resource conflict is determined by one of the viewers selecting "forgo live" or "cancel recording". It should be noted that the system 10 is configurable so that a default resolution is preferably imposed after each of the TVs has received the resource usage action-choice on-screen display 36 once, or after a specified number of circuits around all the TVs or after a specified timeout.

The priority assignment of the TVs is typically based on one or more of the following factors: (a) the physical connection of the TVs 14, 16, 18 to the PVR 20, for example, but not limited to each outlet on the PVR 20 having a fixed priority; (b) the time of day, for example, but not limited to during the evening hours the living room TV having the highest priority and late at night the bedroom having the highest priority; (c) identification of the viewer viewing the TV, for example, but not limited to the viewer pressing a key(s) on the remote control to identify himself; (d) the channel being viewed, for example, but not limited to the news channel having a higher priority than any other channel, regardless of which TV is being used; (e) viewing time, for example, but not limited to which TV is used more as monitored by the resolution arrangement 32 of the PVR 20; and (f) the nature of viewing currently being viewed on the various TVs, for example, but not limited to playback being more "interruptible" than live viewing which is simultaneously being recorded, which in turn is more "interruptible" than live viewing which is not being recorded or a new movie might be less "interruptible" than a weather forecast.

Figure 5:
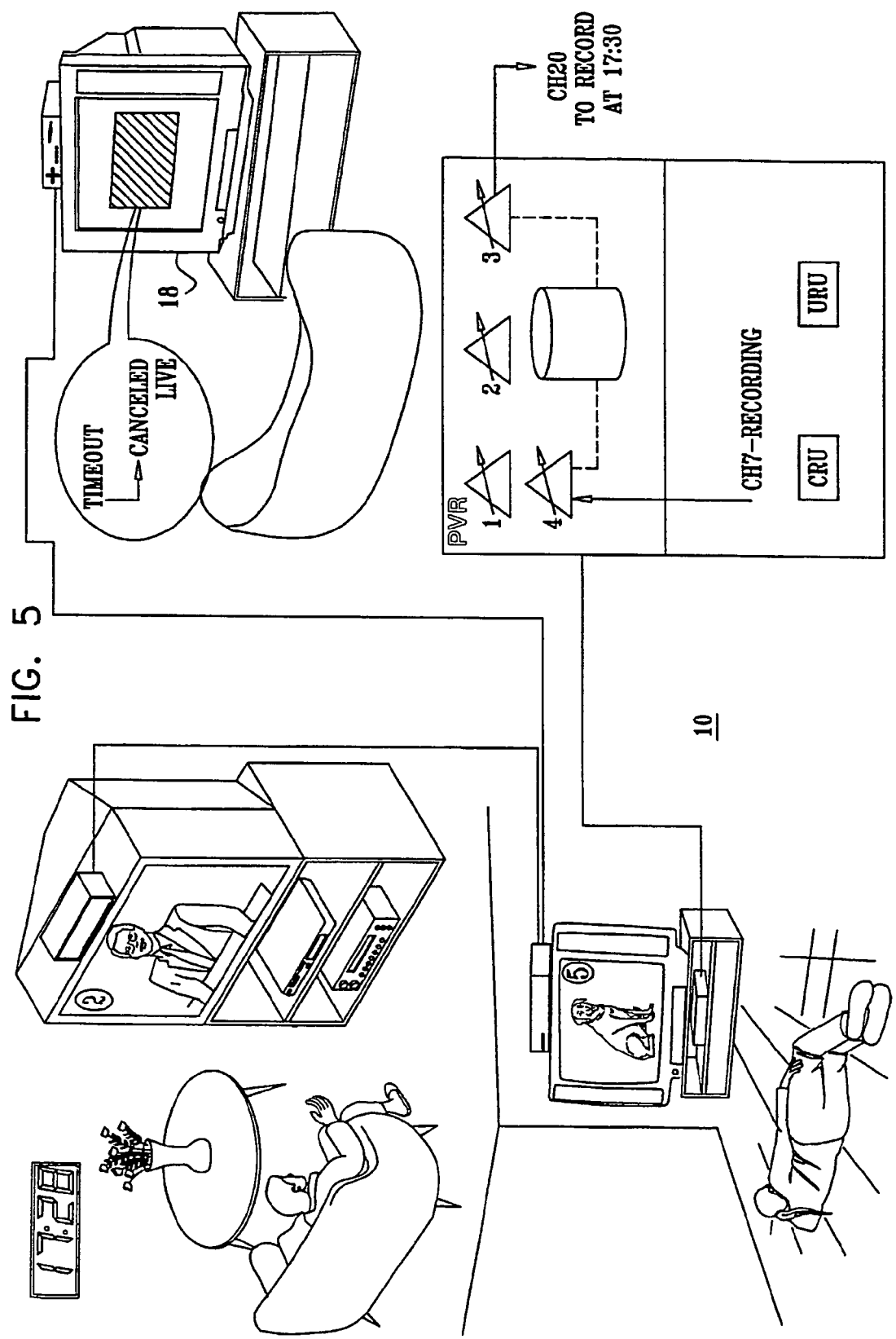
FIG. 5 is a partly pictorial, partly block diagram view of the system of FIG. 1 performing a default resolution after a specified timeout after presenting the resource usage action-choice on-screen display of FIG. 4 to the next lowest priority TV.

Reference is now made to FIG. 5, which is a partly pictorial, partly block diagram view of the system 10 of FIG. 1 performing a default resolution after a specified timeout after presenting the resource usage action-choice on-screen display 36 of FIG. 4 to the next lowest priority TV, the TV 18. The user resolution unit 28 is preferably adapted to apply a default resolution to the usage conflict after a specified timeout after sending the resource usage action-choice on-screen display 36. As described above the timeout is typically the earlier of a predetermined time period or a short time before the resource usage conflict occurs. Therefore, in our example, whereby the TV 18 does not have a viewer viewing the TV, the user resolution unit 28 imposes a default resolution at 17:28, which is two minutes before the booked recording of channel 20 at 17:30. In this case, the default resolution is typically to cancel live TV on the TV 18. However, it will be appreciated by those ordinarily skilled in the art that other default solutions are possible, for example, but not limited to canceling recording of channel 20 at 17:30.

Figure 6:
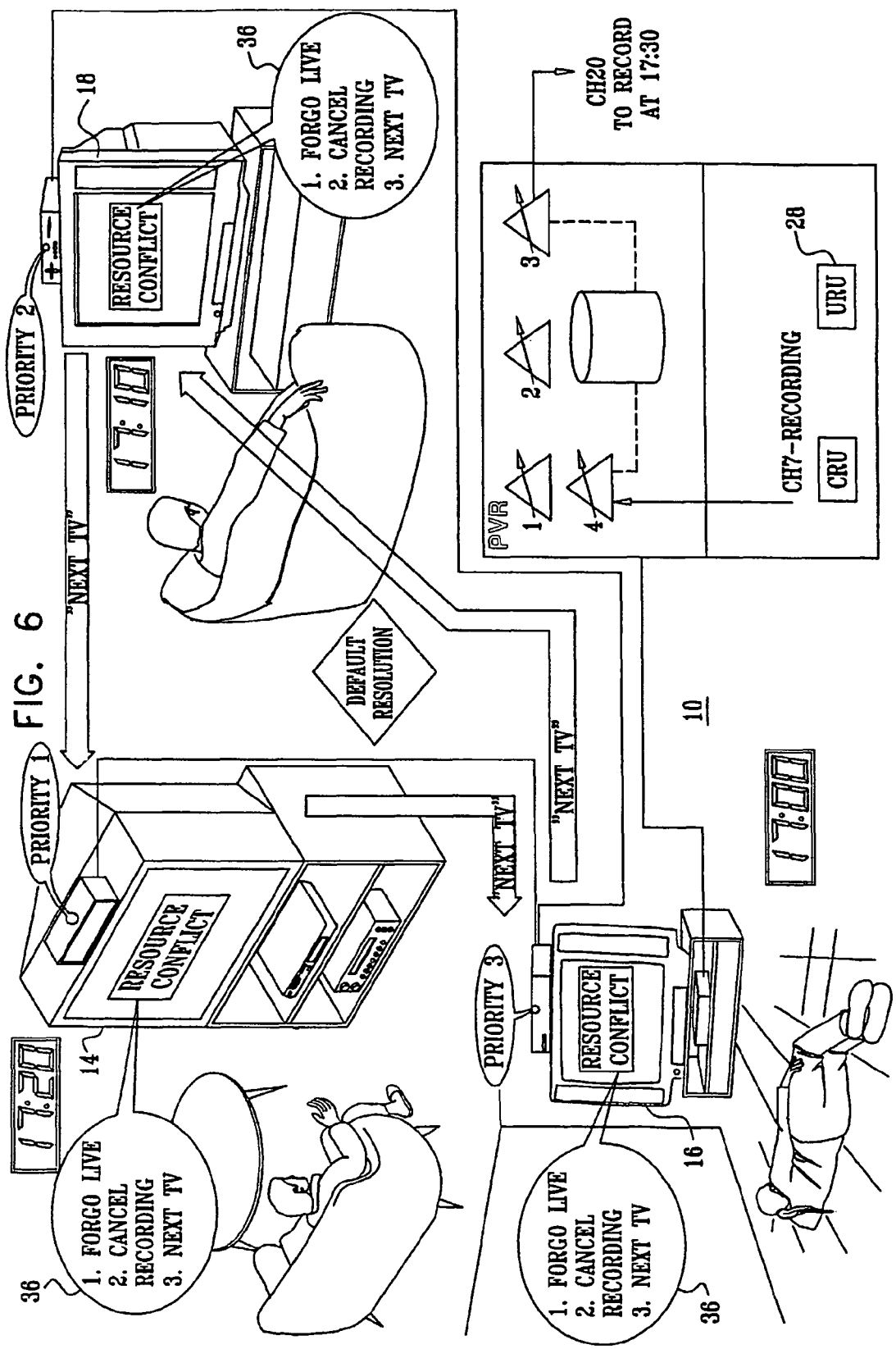
FIG. 6 is a partly pictorial, partly block diagram view of the system of FIG. 1 performing a default resolution after the viewers fail to resolve the conflict.

Reference is now made to FIG. 6, which is a partly pictorial, partly block diagram view of the system 10 of FIG. 1 performing a default resolution after the viewers fail to resolve the conflict. FIG. 6 depicts a scenario described with reference to FIG. 4, whereby the resource usage action-choice on-screen display 36 is passed around the TVs 14, 16, 18 by each viewer of the TVs selecting "Next TV". Alternatively, if one of the viewers does not respond within a given time, the resource usage action-choice on-screen display 36 is automatically passed to the "Next TV".

In accordance with a most preferred embodiment of the present invention, the timeout for each TV to answer before the resource usage action-choice on-screen display 36 is automatically passed on to the "Next TV" is dependent on the TV displaying the resource usage action-choice on-screen display 36. For example, the resource usage action-choice on-screen display 36 is displayed for longer on the TV 14 than on the TV 16 because it is expected that the viewers of the TV 14 are more likely to provide a conflict resolution decision than the viewers of the TV 16.

In the scenario of FIG. 6, if none of the viewers opt to solve the usage conflict by selecting an option which solves the conflict, such as, "forgo live" or "cancel recording", then the user resolution unit 28 imposes a default resolution. Default resolution typically includes canceling a booked recording.

Figure 7:
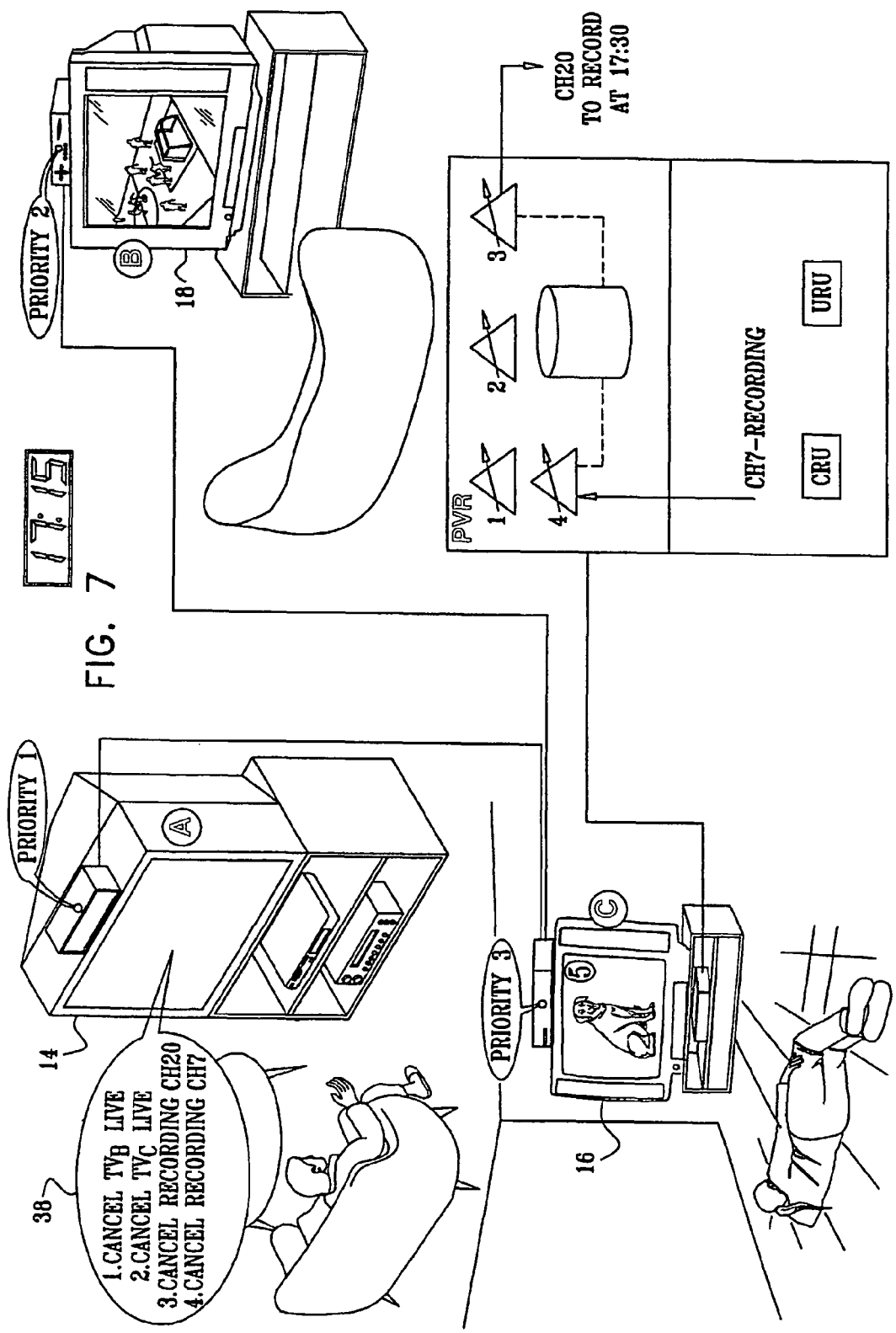
FIG. 7 is a partly pictorial, partly block diagram view of the system of FIG. 1 presenting a specific TV with a resource usage action-choice on-screen display.

Reference is now made to FIG. 7, which is a partly pictorial, partly block diagram view of the system 10 of FIG. 1 presenting a specific TV, the TV 14, with a resource usage action-choice on-screen display 38. Presenting a specific predetermined TV with the resource usage action-choice on-screen display 38 is particularly useful when a multi-TV (networked) PVR is associated with a Parents' TV and a Children's TV. In such a case, it is generally preferable to send all resource usage resolution messages to the Parents' TV. Resource usage action-choice on-screen display 38 typically includes options regarding canceling any of the booked recordings and canceling live TV of any of the TVs 14, 16, 18. It will be appreciated by those ordinarily skilled in the art that if a specified viewer identifies himself to a TV, then the resource usage action-choice on-screen display 38 can be directed to the TV which is associated with that specified viewer. It will be appreciated by those ordinarily skilled in the art that other action-choice options are available, for example, but not limited to "deleting an old recorded program or file".

Figure 8:
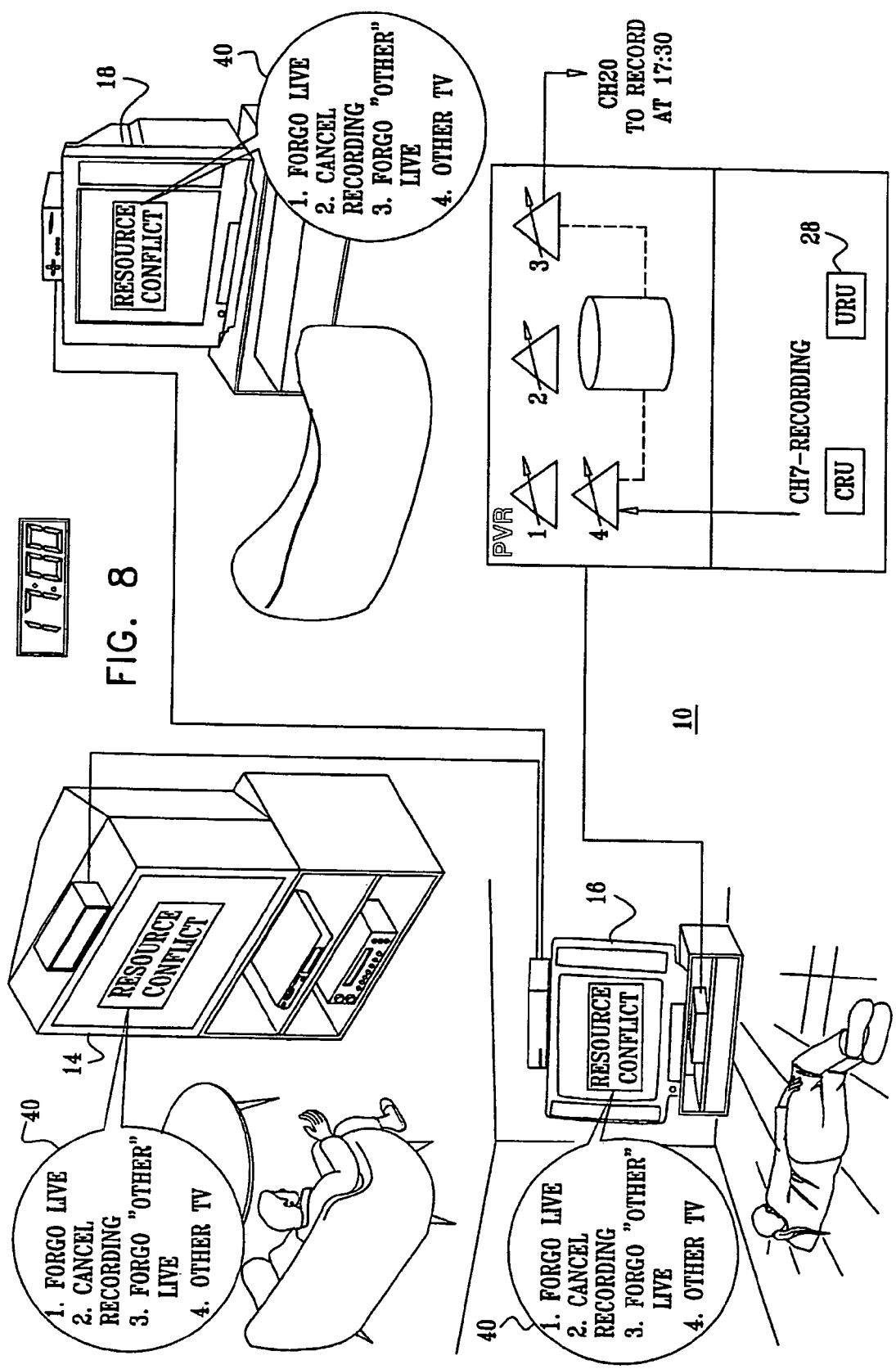
FIG. 8 is a partly pictorial, partly block diagram view of the system of FIG. 1 concurrently presenting all the TVs with a resource usage action-choice on-screen display.

Reference is now made to FIG. 8, which is a partly pictorial, partly block diagram view of the system 10 of FIG. 1 concurrently presenting all the TVs 14, 16, 18 with a resource usage action-choice on-screen display 40. The user resolution unit 28 is preferably adapted to substantially concurrently send the resource usage action-choice on-screen display 40 to all of the TVs.

In accordance with another mode of the system 10, the resource usage action-choice on-screen display 40 is generally sent to a group of two or more of the TVs but not all of them, for example, all the TVs excluding the children only TV. The term "substantially concurrently" is defined herein to include sending the resource usage action-choice on-screen display 40 in quick succession so that it appears that the resource usage action-choice on-screen display 40 is sent to all the TVs at the same time.

The user resolution unit 28 is preferably adapted to resolve the usage conflict based on a first reply of the TVs, responses of the other viewers are generally ignored. However, it should be noted that sometimes it is preferable to take into account other viewers' responses if the responses do not affect the first viewer to respond. See example 4 of table 1, below. It should be noted that due to serialization of digital signals, that there is generally only one "first reply", even if the viewers perceive their inputs as taking place at exactly the same time.

The resource usage action-choice on-screen display 40 typically includes options such as "Forgo Live", "Cancel Recording", "Forgo 'other' Live", "Other TV" or "Send to TV . . . ". The option "Other TV" is interpreted as "remove the on-screen display from my TV and wait for the other viewer(s) to reply to their on-screen display". The option "Send to TV . . . " allows a viewer to send the on-screen display to a specified TV and/or viewer.

The above is an example of "ALL TVs" mode. The "ALL TVs" mode generally achieves a faster resolution to the resource conflict and preferably results in a fairer resolution, since each viewer is given a chance to forgo use of the resources for use by others.

Table 1 gives examples of how the user resolution unit 28 acts upon viewer replies in "ALL TVs" mode. Table 1 shows an example of two viewers. However, it will be appreciated by those ordinarily skilled in the art that the examples can be extended to more than two viewers.

TABLE 1

| Example No. | First Viewer's Response | Second Viewer's Response | Action of user resolution unit |
|---|---|---|---|
| 1 | Forgo Live | Don't care | Use first viewer's live tuner and ignore second viewer's response |
| 2 | Cancel Recording | Don't care | Cancel the recording and ignore second viewer's response |
| 3 | Forgo Other TV live | Forgo Live | Use second viewer's live tuner |
| 4 | Forgo Other TV live | Cancel Recording | Cancel the recording |
| 5 | Forgo Other TV live | Forgo Other TV live | Depending on the selected policy, either repeat the on-screen display cycle again or until a predetermined timeout or impose default resolution |
| 6 | Forgo Other TV live | No reaction | Use second viewer's live tuner. |
| 7 | No reaction | No reaction | Automatic conflict resolution |

It will be appreciated by those ordinarily skilled in the art that other scenarios are possible, for example, but not limited to the first viewer canceling a recording being viewed by the second viewer, leading to solutions such as warning one or more of the viewers, typically based on the priorities of the TVs and/or viewers.

Figure 9:
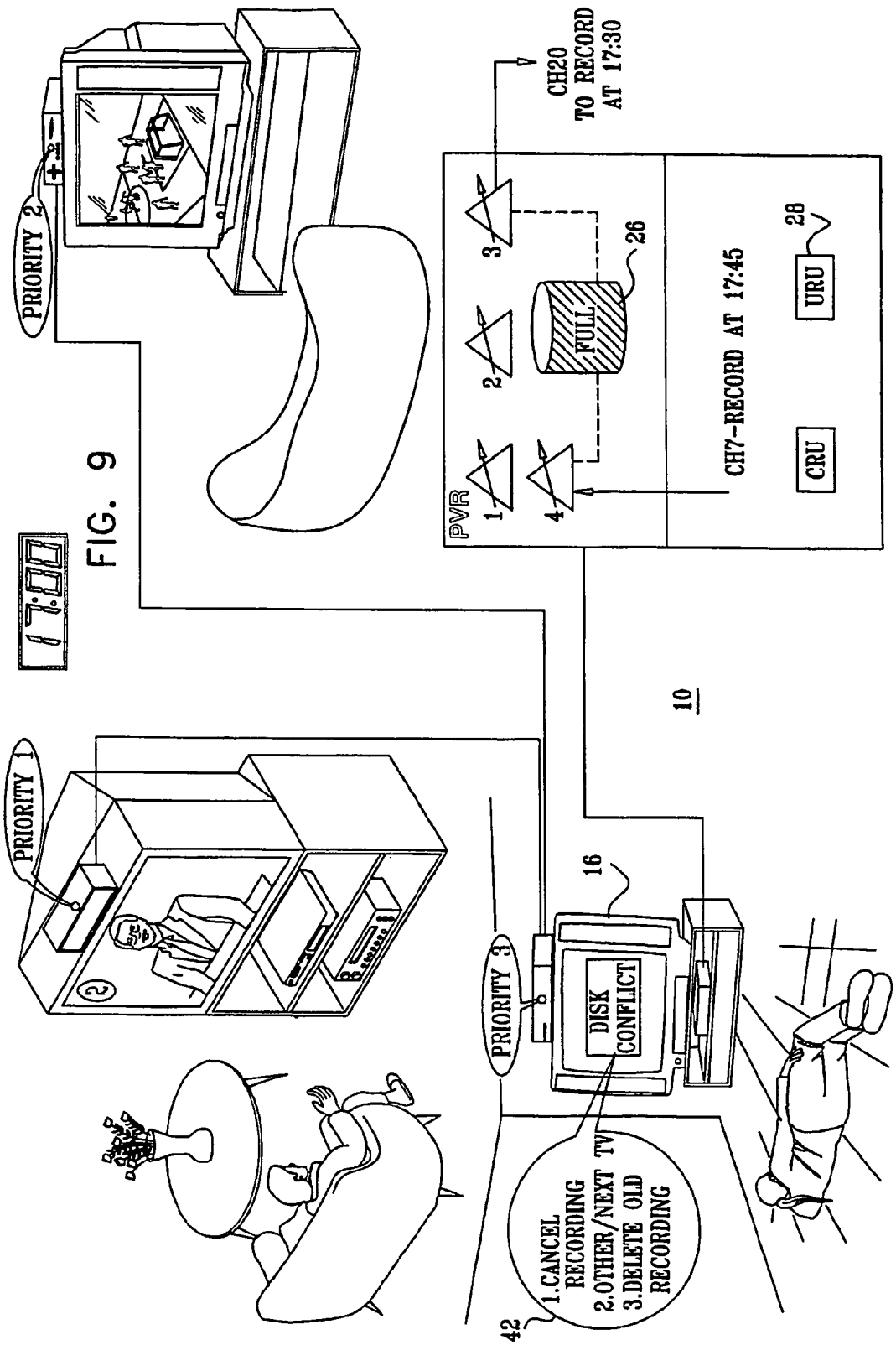
FIG. 9 is a partly pictorial, partly block diagram view of the system of FIG. 1 resolving a disk conflict.

Reference is now made to FIG. 9, which is a partly pictorial, partly block diagram view of the system 10 of FIG. 1 resolving a disk conflict. In the example of FIG. 9 the disk conflict relates to the storage arrangement 26 being full, whereby the storage arrangement 26 is unable to store programs without first deleting or overwriting previously recorded programs. However, it will be appreciated by those ordinarily skilled in the art that disk conflicts may include conflicts relating to the disk drive, such as disk bandwidth.

The disk conflict is also preferably handled using methods substantially the same as described above with reference to FIGS. 1 to 8 using modes of operation such as "Specific TV only" mode, "ALL TVs" mode and "Specific TV first" mode. It will be appreciated that the options given on the on-screen display are generally different for a disk conflict and a tuner conflict. In the example of FIG. 9 a "Specific TV first mode" has been chosen.

The user resolution unit 28 is preferably adapted to send a resource usage action-choice on-screen display 42 to the TV 16. The viewer 12 of the TV 16 is typically given a choice of "Cancel recording" or "Other/Next TV" or "Delete Old Recording—Choose File". However, it will be appreciated by those ordinarily skilled in the art that other options are possible.

Table 2, below, gives examples of how the user resolution unit 28 acts upon viewer replies in "ALL TVs" mode. Table 2 shows an example of two viewers. However, it will be appreciated by those ordinarily skilled in the art that the examples can be extended to more than two viewers.

TABLE 2

| Example No. | First Viewer's Response | Second Viewer's Response | Action of user resolution unit |
|---|---|---|---|
| 1 | Forgo this or other booked Recording | Don't care | Stop the indicated Recording |
| 2 | Other TV | Forgo this or other booked Recording | Stop the indicated Recording |

TABLE 2-continued

| Example No. | First Viewer's Response | Second Viewer's Response | Action of user resolution unit |
|---|---|---|---|
| 3 | Other TV | Other TV | Repeat the on-screen display cycle until one of the viewers responds with "forgo", or until a timeout is reached or until the disk is 99.5% full, for example |
| 4 | Other TV | No reaction | Default conflict resolution or send on-screen display to First Viewer "Sorry - no one there" |
| 5 | No reaction | No reaction | Default conflict resolution |

Figure 10:
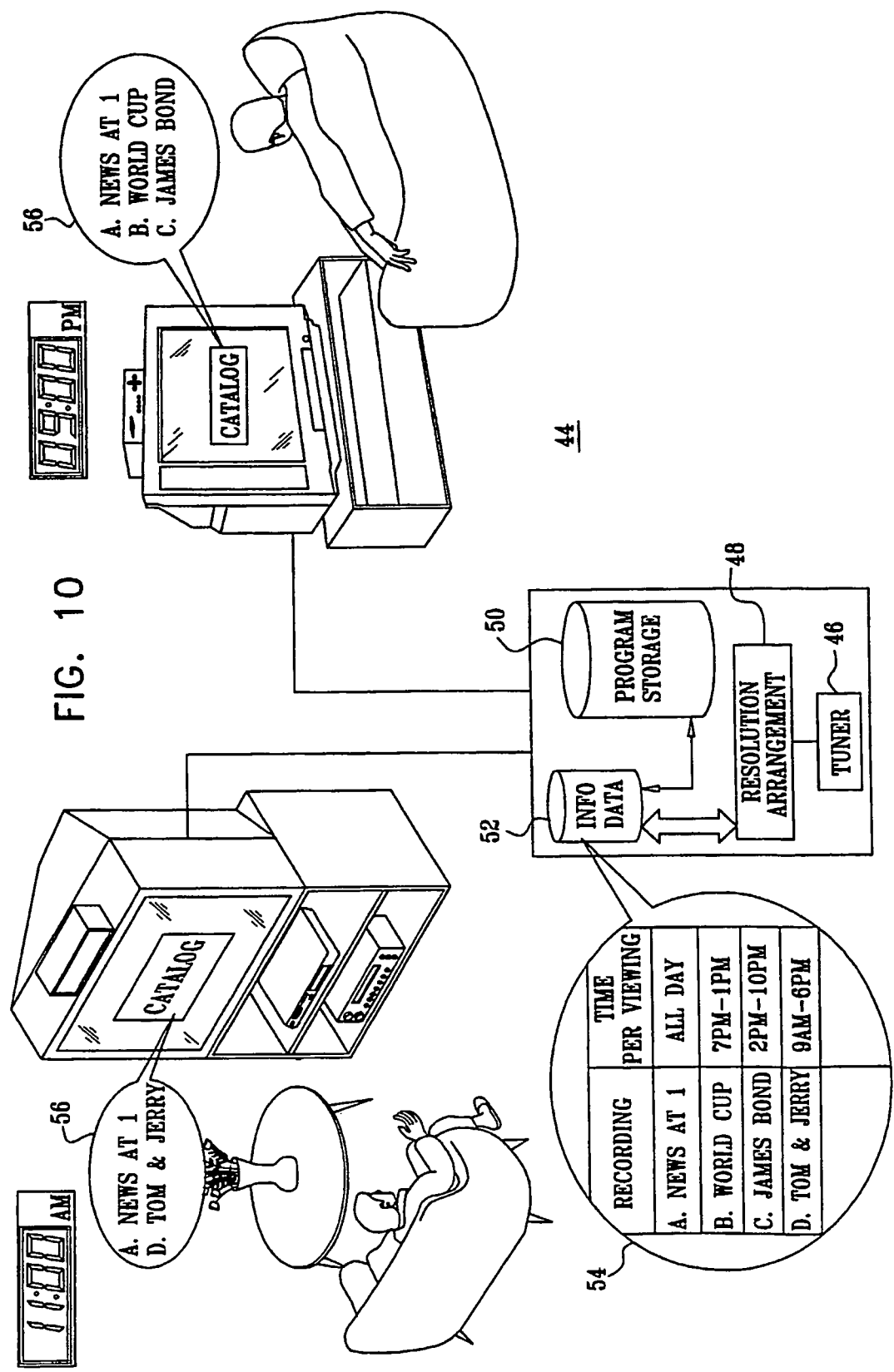
FIG. 10 is a partly pictorial, partly block diagram view of a personal video recorder system that is constructed and operative in accordance with an alternative embodiment of the present invention.
Figure 11:
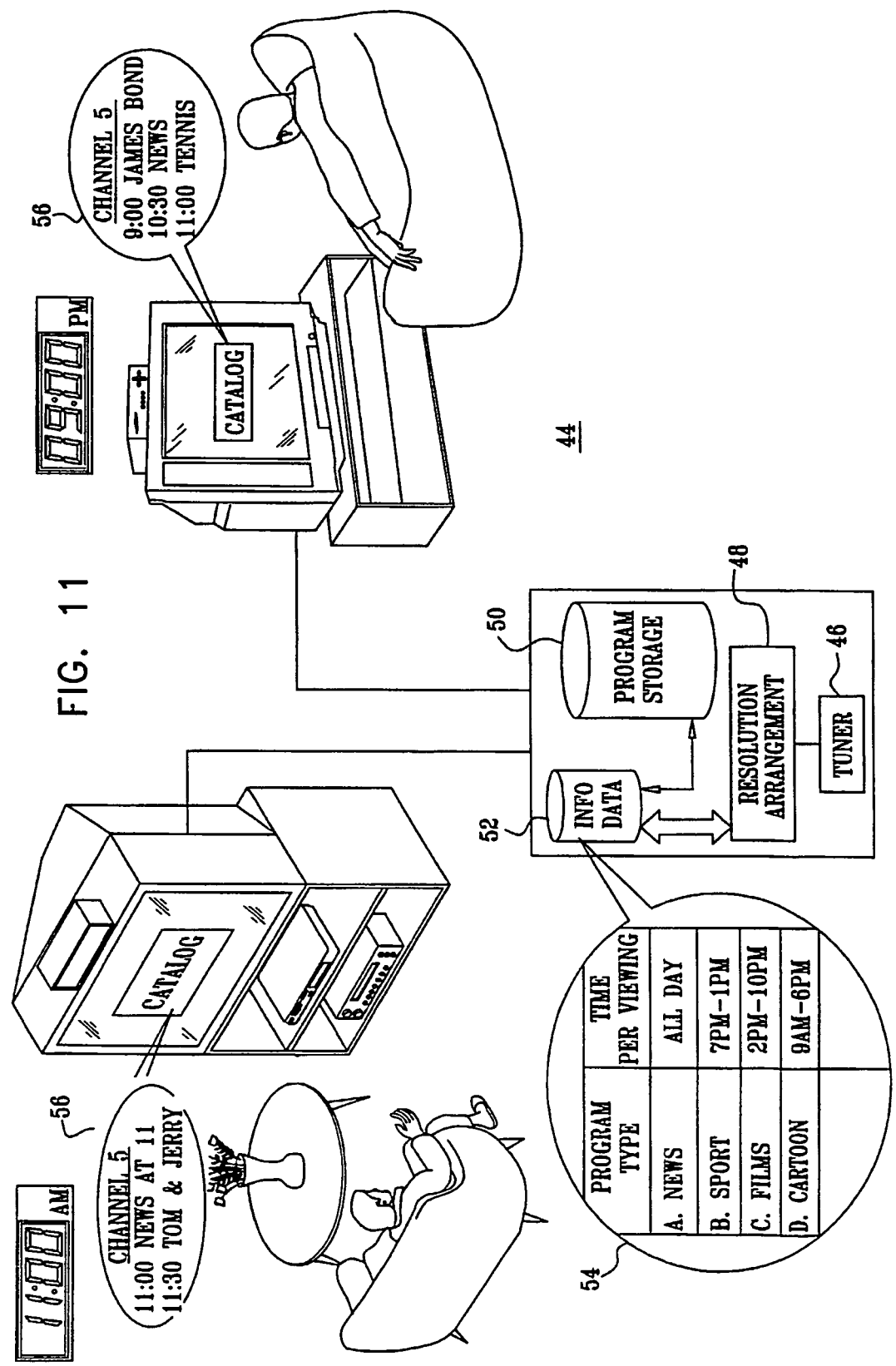
FIG. 11 is a partly pictorial, partly block diagram view of a personal video recorder system that is constructed and operative in accordance with another alternative embodiment of the present invention.

Reference is now made to FIGS. 10 and 11, which are partly pictorial, partly block diagram views of a personal video recorder system 44 that is constructed and operative in accordance with an alternative embodiment of the present invention. The system 44 provides restricted viewing of informational data associated with program broadcasts. The system 44 preferably includes an input device, such as tuner 46, adapted to receive the program broadcasts and informational data about the program broadcasts. It will be appreciated by those ordinarily skilled in the art that input device can include any suitable input device for receiving media content, for example, but not limited to a broadband internet protocol input. The tuner 46 is generally adapted to transmit the program broadcasts onward for display or storage. It will be appreciated by those ordinarily skilled in the art that system 44 can include more than one input device.

The system 44 generally includes a storage arrangement 50 adapted to store the program broadcasts therein. The storage arrangement 50 typically includes a database 52 for storing recorded program informational data 54 about the program broadcasts stored in the storage arrangement 50.

Turning now to FIG. 11, the system 44 also includes a resolution arrangement 48 operationally connected to the tuner 46. The resolution arrangement 48 is adapted to prepare a program catalog screen 56 for display, such that program catalog screen excludes the informational data about one or more program broadcasts for one or more pre-selected time periods.

Turning now to FIG. 10, the resolution arrangement 48 is also preferably adapted to prepare a recorded program catalog screen 56 for display, such that the recorded program catalog screen 56 excludes the recorded program informational data 54 about one or more program broadcasts for one or more pre-selected time periods. For example, content stored on the storage arrangement 50 is assigned a time of day during which it is viewable on the program catalog screen 56. Outside of this time of day window, the content cannot be selected for viewing.

Reference is again made to FIGS. 10 and 11. For configuration purposes, the system 44 is generally adapted to display a "schedule" of programs, or program types, with the time of day at which the programs or program types are visible on the program catalog screen. The time of day assigned to each program may be global for all TVs (in a multi-TV environment) and all viewers (in a multi-TV or single TV environment). However, in accordance with the most preferred embodiment of the present invention, the time of day assigned to each program may be different for different viewers and/or different TVs. Therefore, the resolution arrangement 48 is adapted such that in a multi-TV environment with a plurality of viewers, the exclusion of the informational data about the program broadcasts is configurable per TV and/or per viewer. In a single TV environment with a plurality of viewers, the exclusion of the informational data is configurable per viewer.

The assignment of time of day to programs, or program types, is optionally user defined or automatic. In automatic mode, the assignment depends, for example, on known data about tastes and preferences of the viewers collected explicitly or by inference from viewing habits, demographic and geographic attributes, or any other appropriate criterion. An example of a system for determining tastes and preferences of viewers by inference from viewing habits is described in U.S. Pat. No. 6,637,029 to Maissel, et al., which is hereby incorporated herein by reference.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will also be appreciated by persons skilled in the art that the present invention is not limited by what has been particularly shown and described hereinabove. Rather the scope of the invention is defined only by the claims which follow.

What is claimed is:

1. A system for managing resource-usage conflict among a plurality of viewers associated with a plurality of TVs, comprising:
a plurality of resources for shared usage among the viewers, the resources including at least one input device adapted to receive a program broadcast and to transmit the program broadcast onward for display; and
a resolution arrangement operationally connected to the at least one input device, the resolution arrangement being adapted to:
identify a usage conflict of at least one of the resources;
pass, in a consecutive manner, an on-screen display having a resource usage action-choice among the TVs for display by the TVs, so that the on-screen display is first displayed by one of the TVs and then displayed by another one of the TVs; and
determine the order of passing the on-screen display based on a priority assignment of the TVs, the priority assignment being based at least in part on a nature of viewing currently being viewed on each of the TVs, wherein a playback nature of viewing is accorded a lower priority than a live with simultaneous recording nature of viewing which, in turn, is accorded a lower priority than a live viewing which is not being recorded.

2. The system according to claim 1, wherein the resource usage action-choice includes an option for passing the resource usage action-choice to another one of the TVs.

3. The system according to claim 2, wherein the resolution arrangement is further adapted to determine the other TV based on a priority assignment of the TVs.

4. The system according to claim 3, wherein the resolution arrangement is adapted to determine the other TV based on a next lowest priority TV, in relation to a priority of the TV which was sent the resource usage action-choice, according to the priority assignment.

5. The system according to claim 3, wherein the resolution arrangement is adapted to determine the other TV based on a next highest priority TV, in relation to a priority of the TV which was sent the resource usage action-choice, according to the priority assignment.

6. The system according to claim 1, wherein the priority assignment is based in part on a physical connection of each of the TVs to the system.

7. The system according to claim 1, wherein the priority assignment is based in part on a time of day.

8. The system according to claim 1, wherein the priority assignment is based in part on which of the viewers are viewing each of the TVs.

9. The system according to claim 1, wherein the priority assignment is based in part on a channel being viewed on each of the TVs.

10. The system according to claim 1, wherein the priority assignment is based in part on viewing time of each of the TVs.

11. The system according to claim 1, wherein the resolution arrangement is further adapted to resolve the usage conflict based on a reply to the resource usage action-choice.

12. The system according to claim 1, wherein the resolution arrangement is further adapted to apply a default resolution to the usage conflict after a specified time-out after sending the on-screen display.

13. The system according to claim 1, wherein the resource usage action-choice has a plurality of options including forgo-live and cancel recording.

14. The system according to claim 13, wherein the options include an option to send the on screen display to another one of the TVs.

15. The system according to claim 1, wherein the input device is a tuner.

16. The system according to claim 1, wherein the input device is a removable media drive.

17. The system according to claim 1, wherein the input device is a broadband internet protocol input.

18. The system according to claim 1, wherein: the resources include a storage arrangement adapted to store the program broadcast therein; and the input device is adapted to transmit the program broadcast to the storage arrangement.

19. The system according to claim 18, wherein the resource usage action-choice includes an option to delete a recording.

20. The system according to claim 1, wherein:
the at least one input device is adapted to receive informational data about a plurality of program broadcasts; and
the resolution arrangement is adapted to prepare a program catalog screen for display, such that the program catalog screen excludes the informational data about at least one of the program broadcasts for at least one pre-selected time period.

21. The system according to claim 20, wherein the resolution arrangement is adapted such that exclusion of the informational data about the program broadcasts is at least one of viewer dependent and TV dependent.

22. The system according to claim 20, further comprising:
a storage arrangement adapted to store program broadcasts therein; and
a database adapted to store recorded program informational data about the program broadcasts stored in the storage arrangement, wherein the resolution arrangement is further adapted to prepare a recorded program catalog screen for display, such that the recorded program catalog screen excludes the recorded program informational data about at least one of the program broadcasts for at least one pre-selected time period.

23. A method for managing resource-usage conflict of a plurality of resources among a plurality of viewers associated with a plurality of TVs, the resources including at least one input device, each input device being adapted to receive a program broadcast and transmit the program broadcast onward for display, the method comprising:
identifying a usage conflict of at least one of the resources;
passing, in a consecutive manner, an on-screen display having a resource usage action-choice among the TVs for display by the TVs, so that the on-screen display is first displayed by one of the TVs and then displayed by another one of the TVs; and
determining the order of passing the on-screen display based on a priority assignment of the TVs, the priority assignment being based at least in part on a nature of viewing currently being viewed on each of the TVs, wherein a playback nature of viewing is accorded a lower priority than a live with simultaneous recording nature of viewing which, in turn, is accorded a lower priority than a live viewing which is not being recorded.

24. A system for managing resource-usage conflict among a plurality of viewers associated with a plurality of TVs, comprising:
means for shared usage among the viewers, the means including means for receiving a program broadcast and transmitting the program broadcast onward for display; and
means for resolution operationally connected to the means for receiving and transmitting, the means for resolution being adapted to:
identify a usage conflict of at least one of the means for shared usage;
pass, in a consecutive manner, an on-screen display having a resource usage action-choice among the TVs for display by the TVs, so that the on-screen display is first displayed by one of the TVs and then displayed by another one of the TVs; and
determine the order of passing the on-screen display based on a priority assignment of the TVs, the priority assignment being based at least in part on a nature of viewing currently being viewed on each of the TVs, wherein a playback nature of viewing is accorded a lower priority than a live with simultaneous recording nature of viewing which, in turn, is accorded a lower priority than a live viewing which is not being recorded.

25. The method according to claim 23, wherein the priority assignment is based in part on a physical connection of each of the TVs to the at least one input device.

26. The method according to claim 23, wherein the priority assignment is based in part on a time of day.

27. The method according to claim 23, wherein the priority assignment is based in part on which of the viewers are viewing each of the TVs.

28. The method according to claim 23, wherein the priority assignment is based in part on a channel being viewed on each of the TVs.

29. The method according to claim 23, wherein the priority assignment is based in part on viewing time of each of the TVs.

* * * * *

UNITED STATES PATENT AND TRADEMARK OFFICE
CERTIFICATE OF CORRECTION

| | | |
|---|---|---|
| PATENT NO. | : 8,677,429 B2 | Page 1 of 1 |
| APPLICATION NO. | : 11/579651 | |
| DATED | : March 18, 2014 | |
| INVENTOR(S) | : Lehman et al. | |

It is certified that error appears in the above-identified patent and that said Letters Patent is hereby corrected as shown below:

Title Page, item (54) and in the Specification, Column 1, line 2, in the Title, delete "Television" and substitute therefor --Televisions--.

In the Specification
In column 6, line 58, delete "IVs" and substitute therefor --TVs--.

Signed and Sealed this
Third Day of June, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,677,429 B2
APPLICATION NO. : 11/579651
DATED : March 18, 2014
INVENTOR(S) : Lehman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1953 days.

Signed and Sealed this
Twenty-ninth Day of September, 2015

Michelle K. Lee
*Director of the United States Patent and Trademark Office*